United States Patent
Iwasaki

(10) Patent No.: US 6,726,874 B2
(45) Date of Patent: Apr. 27, 2004

(54) HOLLOW ARTICLE AND ITS MANUFACTURING METHOD AND APPARATUS THEREOF

(75) Inventor: Kenji Iwasaki, Aichi perfecture (JP)

(73) Assignee: Kybraku Co., LTD, Kyoto (JP)

( * ) Notice: Subject to any disclaimer, the term of this patent is extended or adjusted under 35 U.S.C. 154(b) by 0 days.

(21) Appl. No.: 10/300,988

(22) Filed: Nov. 21, 2002

(65) Prior Publication Data

US 2003/0071388 A1 Apr. 17, 2003

Related U.S. Application Data

(62) Division of application No. 09/794,579, filed on Feb. 27, 2001, now Pat. No. 6,592,358.

(30) Foreign Application Priority Data

Feb. 29, 2000 (JP) .......................................... 2000-54898
Dec. 26, 2000 (JP) ........................................ 2000-394056

(51) Int. Cl.$^7$ .............................................. B29C 49/04
(52) U.S. Cl. ...................... 264/540; 264/531; 425/525
(58) Field of Search ................................. 264/540, 531; 425/525

(56) References Cited

U.S. PATENT DOCUMENTS

| | | |
|---|---|---|
| 3,935,358 A | 1/1976 | Wyeth et al. |
| 4,108,324 A | 8/1978 | Krishnakumar et al. |
| 4,339,408 A | 7/1982 | Jenkins |
| 4,650,627 A | 3/1987 | Peters |
| 5,004,627 A | 4/1991 | Presswood et al. |
| 5,225,141 A | 7/1993 | Hendry |
| 5,324,189 A | 6/1994 | Hendry |
| 5,618,607 A | 4/1997 | Togawa et al. |
| 5,639,522 A | 6/1997 | Maki et al. |
| 6,060,144 A | 5/2000 | Kimura et al. |
| 2002/0003199 A1 | 1/2002 | Check et al. |

FOREIGN PATENT DOCUMENTS

| | | |
|---|---|---|
| CA | 1278660 | 1/1991 |
| JP | 59232828 | * 12/1984 |
| JP | 363165117 | * 7/1988 |
| JP | 07-061304 | 3/1995 |
| JP | 11-59491 | 3/1999 |
| JP | 2000-43541 | 2/2000 |
| JP | 2000-54898 | 2/2000 |
| JP | 2000-394056 | 12/2000 |
| JP | 2002-193057 | 7/2002 |

OTHER PUBLICATIONS

Lorenzo, Jim, Evaluation of Constitutive Material Models in Impact Analysis, http://www.datapointlabs.com/SPR98/article3.html, pp. 1–4.

Rosato, D. V., The complete Blow Molding Operation, Chapter 1 "Blow Molding Handbook", Hanser Publishers, pp. 1–27.

* cited by examiner

Primary Examiner—Suzanne E. McDowell
(74) Attorney, Agent, or Firm—Maine & Asmus

(57) ABSTRACT

The present invention is a hollow article with an integral impact absorbing rib and the method of manufacturing the same. The apparatus is a hollow article made of thermoplastic resin and integrally formed by blow molding, comprising a first wall and a second wall confronting across a spacing. There is an integral rib between the first wall and the second wall, wherein the integral rib comprises a flat rib between the walls and one or more hollow ribs adjacent to each of two side ends of the flat rib. The impact absorbing rib is disposed at intervals and in an impact action direction. The rib is uniform in shape, dimensions and wall width, and free from reduction of wall width of the inner rib, yet possessing proper structural support and mechanical strength, and excellent in impact absorbing performance.

16 Claims, 15 Drawing Sheets

(a)

(b)

(a)

(b)

(a)

(b)

(a)

(b)

(a)

(b)

(a)

(b)

(a)

(b)

(a)

(b)

(a)

(b)

(PRIOR ART)

(a)

(PRIOR ART)

(b)

(PRIOR ART)

(PRIOR ART)

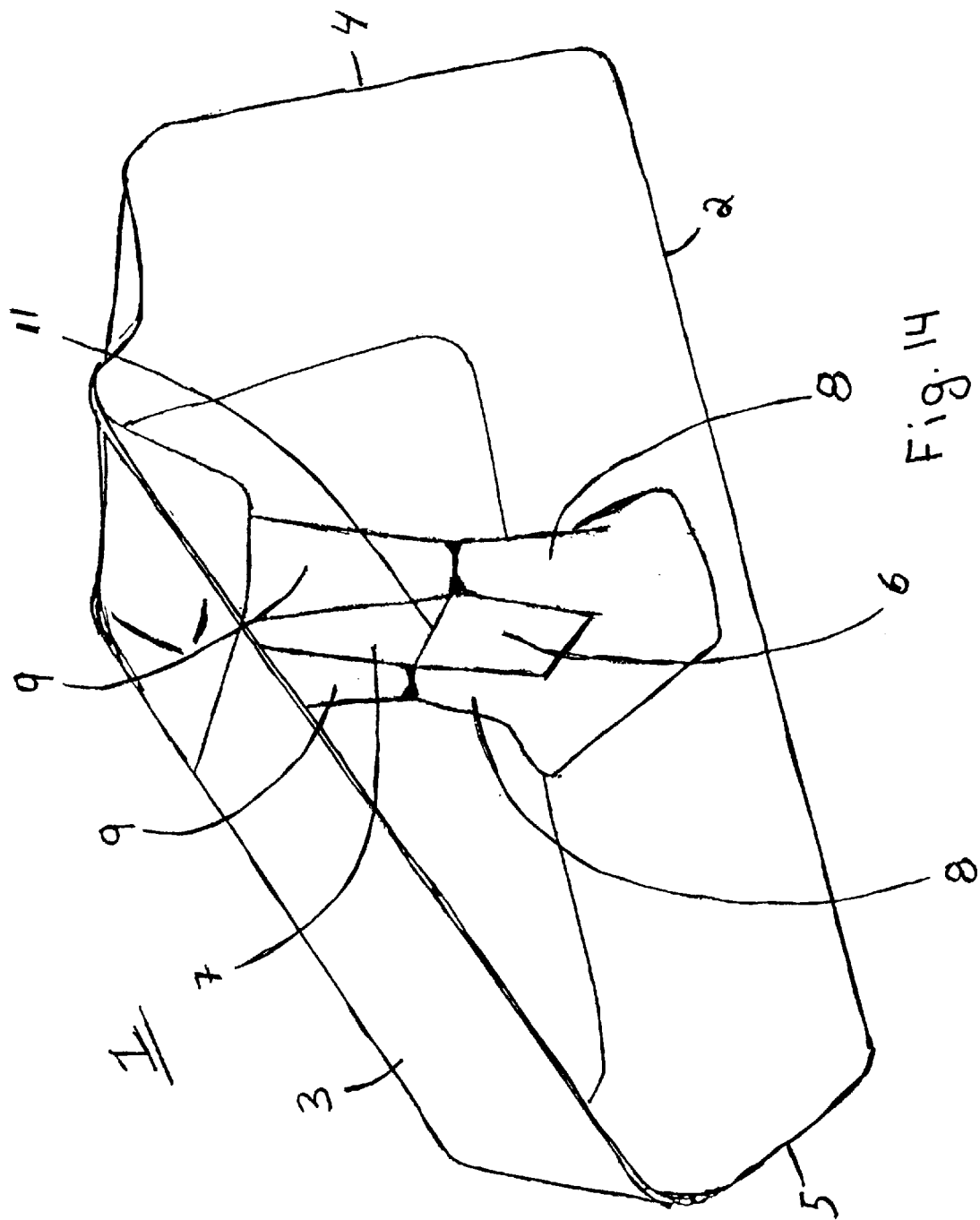

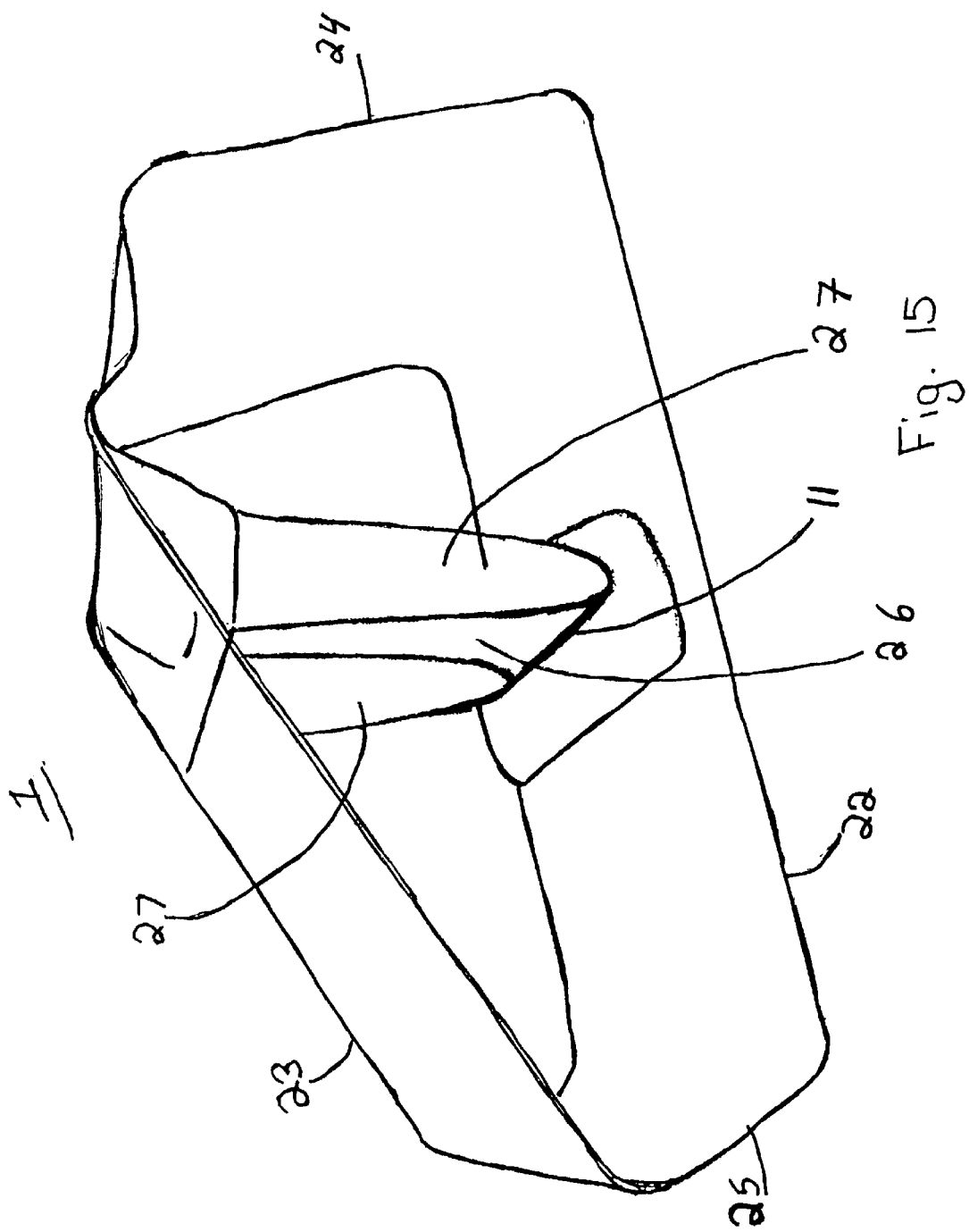

HOLLOW ARTICLE AND ITS MANUFACTURING METHOD AND APPARATUS THEREOF

CROSS REFERENCE TO RELATED APPLICATIONS

This application is a divisional application that is related and claims priority under 35 U.S.C. §120 to U.S. Non-Provisional application Ser. No. 09/794,579 filed Feb. 27, 2001, now U.S. Pat. No 6,592,358, which is incorporated herein by reference for all purposes, and which in turn claims priority under 35 U.S.C. Section 119 from a Japanese Patent Application No. 2000-54898 filed on Feb. 29, 2000, and a Japanese Patent Application No. 2000-394056 filed on Dec. 26, 2000, which are incorporated herein by reference for all purposes.

BACKGROUND OF THE INVENTION

1. Technical Field of the Invention

The present invention relates to thermoplastic hollow articles that are excellent in rigidity and impact absorption qualities, as well as to the manufacturing process for producing the hollow articles.

2. Background Art

Hollow articles are well known in the art and used in a variety of industries and applications. These plastic hollow articles are lightweight, strong, and relatively inexpensive to manufacture using injection or blow molding techniques.

There are numerous examples of products that employ hollow articles, such as ducts, panels, or housings for electronics, appliances, automobiles, and house wares. In many homes these hollow articles are found in walls, partitions, and panels, such as entrance doors, and indoor air conditioning ducts. Furniture is also manufactured with hollow structures, and includes top plates of desk, partition panels, and bookshelf panels.

In the appliance sector, housings of some of the components are hollow such as used for refrigerators and televisions. The hollow articles are also used in office equipment, such as the housings of copy machines, facsimile machines and computer peripherals.

Panels and ducts of dwelling facilities, furniture panel, housing of electric household appliances, housing of office equipment and automotive parts are often required to have a high rigidity. Hollow articles used in such applications are manufactured in integral structures combining a first wall and a second wall by means of a rib linking them mutually within a hollow space. In cases where the appearance is important on both face and back surfaces, a structure termed an "inner rib" is employed. Thus, the first wall and the second wall are projected, in blow molding, until a part of the second wall contacts with a wall to be linked integrally within the hollow space there between.

The automobile industry uses hollow articles because of the mechanical properties and weight characteristics. Automotive parts include console box lid, hood, door panel, and air conditioning duct. For example, in order to assure the rigidity as a product or to protect the crew from impact of collision, an automotive roof side duct is disposed near both sides of ceiling as explained in Japanese Patent Application Laid-Open No. 2000-43541.

The automobile industry is particularly interested in increasing the safety of the vehicles, and at a minimum, complying with the certain safety guidelines. According to the Federal Motor Vehicle Safety Standards (FMVSS), the hollow articles must have a minimum level of impact absorption. The guidelines are established under the Department of Transportation by the National Highway Traffic Safety Administration. There are a number of guidelines and requirements, including FMVSS 201 that addresses occupant protection in interior impact. There are other guidelines that describe related topics such as resistance to roof crushing. Head injuries are calculated according to a 'heading injury criteria' (HIC) that is obtained from the deceleration of the head during the duration of the impact. These federal standards must be satisfied in order for vehicle to enter the U.S. market. And, these regulations are continuously being updated as new innovations and features result in improved safety characteristics.

There are many studies that demonstrate that significant head injuries and trauma occur when the driver or passengers head strikes the interior roof and side panels. A rigid interior wall offers little impact absorbing qualities when struck by a human head. There are a number of techniques used to impart some shock absorbing qualities into the roof and interior panels, but the strict government standards continue to increase and demand greater safety thresholds. The use of ceiling air bags and structural modifications to the support elements are designed to address the impact absorbing qualities, however there are issues such as cost and manufacturability that limit the wide-spread use of such features.

As shown in prior art FIG. 11, the inner rib of a roof side duct is integrally formed by blow molding, wherein an inside wall 101 facing a ceiling interior member 107 and an outside wall 102 facing an inner panel 106 of car body confront each other. A flat impact absorbing rib 103 is disposed along the longitudinal direction in a space 110 between the inside wall 101 and outside wall 102. A general manufacturing method of this roof side duct is explained by referring to FIG. 12a, 12b, and FIG. 13.

Prior art FIG. 12a shows a molten parison 300 being poured into opened split molds 201, 202, and then the molds are closed. Next, a rib forming plate 203 is projected toward the second mold 202, and a neck 303 is formed in the area of first wall 301 of the parison, and its leading end is pressed tightly to the area of second wall 302. Then, as shown in FIG. 12a, the rib forming plate 203 is pulled in, the pressurized air is introduced into the parison 300, and is inflated into a shape along the cavity by the internal pressure of the pressurized air, and the neck 303 is pressed and deformed in the direction of the arrows, while confronting walls are fused integrally, so that an impact absorbing rib 304 is formed.

According to the prior art, as shown in FIG. 13, when pulling in the rib forming plate 203, after projecting the rib forming plate and forming a neck at first wall side of the parison, the neck is dragged in the backward direction of the rib forming plate 203, or is elongated by the blow pressure in the blow process, and the wall thickness and width of the flat rib formed as the confronting walls of the neck are compressed from both sides by internal pressure of the pressurized air are decreased. Thus, at portion 305 the inner rib is reduced in wall width and the shape, and the dimensions and wall thickness of the flat rib are not uniform on the whole. As a result, the rigidity and other mechanical strength of the impact absorbing rib 304 are lowered, and the duct having sufficient impact absorbing performance is lessened. Furthermore, the varying thickness of the inner rib results in some inconsistency in impact absorbing qualities. In the described application, such a product may result in inadequate protection in the event of a collision. Other applications may result in improper rigidity and strength and at the very least, inconsistency in the produced hollow article.

What is needed is a hollow article with a rib of uniform shape, dimensions and wall width. The rib should have excellent mechanical strength and properties. In one embodiment, such as automotive, the hollow article with the rib should have impact absorbing qualities to protect the driver and passengers. The manufacturing method for such an improved hollow article should be cost-effective and have a low defect rate.

SUMMARY OF THE INVENTION

The invention is devised in the light of the problems of the prior art described herein. The present invention is a hollow article having an impact absorbing rib uniform in shape, dimensions and wall width on the whole, especially free from reduction of wall width of the inner rib, yet possessing proper rigidity and mechanical strength, and excellent impact absorbing performance.

Another aspect of the invention is to ensure compliance with the FMVSS 201 regulations addressing interior head injury criteria. According to FMVSS 201, the interior of the vehicle in the U.S marketplace must have a head injury criteria (HIC) of less than 1000. The value is determined by striking a dummy head of a certain mass into the regions of the vehicle interior at a certain speed and measuring the shock value. The present invention results in an article that is well within the federal guidelines. In addition, present invention has a greater consistency and repeatability as compared to prior art products that have a higher rate of failure of compliance. The prior art components are generally unable to satisfy the HIC standards, and therefore cannot pass the FMVSS 201 specifications. For example, the roof side ducts of the prior art were tested and the HIC was found to be approximately 1500, which is above the 1000 HIC threshold.

One object of the invention is a hollow article made of a thermoplastic resin and integrally formed by blow molding, comprising a first wall and a second wall confronting across a spacing, an integral rib between the first wall and the second wall, wherein the integral rib comprises a flat rib projecting from the second wall to the first wall, and a hollow rib adjacent to each of two side ends of the flat rib, wherein the flat rib and the hollow rib are fused to an inner side of the first wall.

A further object is the hollow article, wherein the hollow rib is tapered with a more narrow portion at the first wall. Additionally, wherein the integral rib is disposed along a longitudinal direction of the hollow article. And, wherein a plurality of the integral ribs are disposed at a mutual spacing.

An additional object is the hollow article, wherein the integral rib is disposed in an impact action direction. Also, wherein the hollow article is an automobile component An object of the invention is a hollow article made of thermoplastic resin, integrally formed by blow molding, comprising a first wall and a second wall confronting across a spacing, an integral rib disposed between the first wall and the second wall, wherein the integral rib comprises a first flat rib projecting from the first wall to a fusion portion, a first hollow rib adjacent to each of two side ends of the first flat rib, a second flat rib projecting from the second wall to the fusion portion, a second hollow rib adjacent to each of two side ends of the second flat rib, wherein the first flat rib and the second flat rib are fused to each other at the fusion portion, and wherein the first hollow rib and the second hollow rib are fused to each other at the fusion portion.

Another object is the hollow article, wherein the first hollow rib and the second hollow rib form a combined concave hollow rib. Also, the hollow article, wherein the integral rib is disposed along a longitudinal direction of the hollow article. Additional objects of the invention include the hollow article, wherein a plurality of the integral ribs are disposed at a mutual spacing, and also wherein the integral rib is disposed in an impact action direction.

An object of the invention is a method of blow molding a hollow article having a first wall and a second wall confronting across a spacing, with an integral rib disposed between the first wall and the second wall, comprising the steps of opening a split mold, wherein the split mold has a first mold half with a cavity, a slide core and a pair of support cores on either side of the slide core, and a second mold half with a cavity, a slide core and a pair of support cores on either side of the slide core. Extruding a parison of molten thermoplastic resin between the split mold and closing the split mold, thereby deforming the parison with each sliding core and each of the pair of support cores and forming a first recess and a second recess, wherein a leading end of the first recess and a leading end of the second recess are fused. Next, retracting each of the slide cores and introducing a pressure substance into the parison and inflating the parison along a cavity surface of the split molds and the support cores and forming the integral rib between the first wall and the second wall, wherein the integral rib comprises a pair of flat ribs and a pair of hollow ribs, and cooling the split mold, opening the split mold and removing the hollow article.

And additional object is the method of blow molding, wherein the step of retracting the slide cores is simultaneous with the step of introducing the pressure substance. Also, wherein the pressurized substance is a gas.

An object of the invention is a method of blow molding a hollow article having a first wall and a second wall confronting across a spacing, with an integral rib disposed between the first wall and the second wall, comprising the steps of opening a split mold, wherein the split mold has a first mold half with a cavity, and a second mold half with a cavity, a slide core and a pair of support cores on either side of the slide core, extruding a parison of molten thermoplastic resin between the split mold, closing the split mold, deforming the parison with the sliding core and the pair of support cores and forming a recess, wherein a leading end of the recess is fused to an inner surface of an opposing wall side. Finally, retracting the slide core, introducing a pressure substance into the parison, inflating the parison along a cavity surface of the split molds and the support cores and forming the integral rib between the first wall and the second wall, wherein the integral rib comprises a flat rib and a pair of hollow ribs, cooling the split mold, opening the split mold and removing the hollow article.

A further object is the blow molding method, wherein the step of retracting the slide cores is simultaneous with the step of introducing the pressure substance. Furthermore, wherein the pressurized substance is a gas.

An object of the invention is an apparatus for blow molding a hollow article from a thermoplastic resin, having a first wall and a second wall confronting across a hollow space, and an integral rib disposed for providing structural support and absorbing impact between the first wall and the second wall, comprising a split mold with a first mold half and a second mold half, a slidably engageable slide core for forming a flat rib disposed in at least one of the mold halves, a pair of support cores disposed on at least one of the mold halves for forming a hollow rib and adjacent to each of two side ends of the slide core, and a means of retracting the sliding core.

Additionally, the apparatus for blow molding, wherein the pair of support cores is integrally disposed in the mold halves. And, wherein the pair of support cores is retractable from within the mold halves. Finally, the apparatus for blow molding wherein a surface of the slide core is treated with fluorine film coating so as to slide smoothly with the parison.

Still other objects and advantages of the present invention will become readily apparent to those skilled in this art from the following detailed description, wherein I have shown and described only a preferred embodiment of the invention, simply by way of illustration of the best mode contemplated by me on carrying out my invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4a is an example of a manufacturing method of the hollow article for an automobile, with an explanatory diagram showing a state of disposing a parison between opened molds FIG. 4b is an example of a manufacturing method for the hollow article for an automobile, showing a schematic sectional view along line A—A in FIG. 4a.

FIG. 8b is another example of a manufacturing method of a hollow article for the automobile, depicting a schematic sectional view along line A—A in FIG. 8a.

FIG. 14 is a sectional view side view showing shape of the hollow rib for the embodiment using two sliding cores, wherein the combined hollow ribs are concave in appearance FIG. 15 is a sectional view side view shape of the hollow rib for the embodiment using one sliding core, wherein the hollow rib is tapered in appearance

REFERENCE NUMERALS

FIGS. 1a, 1b, 14

Figure 1:
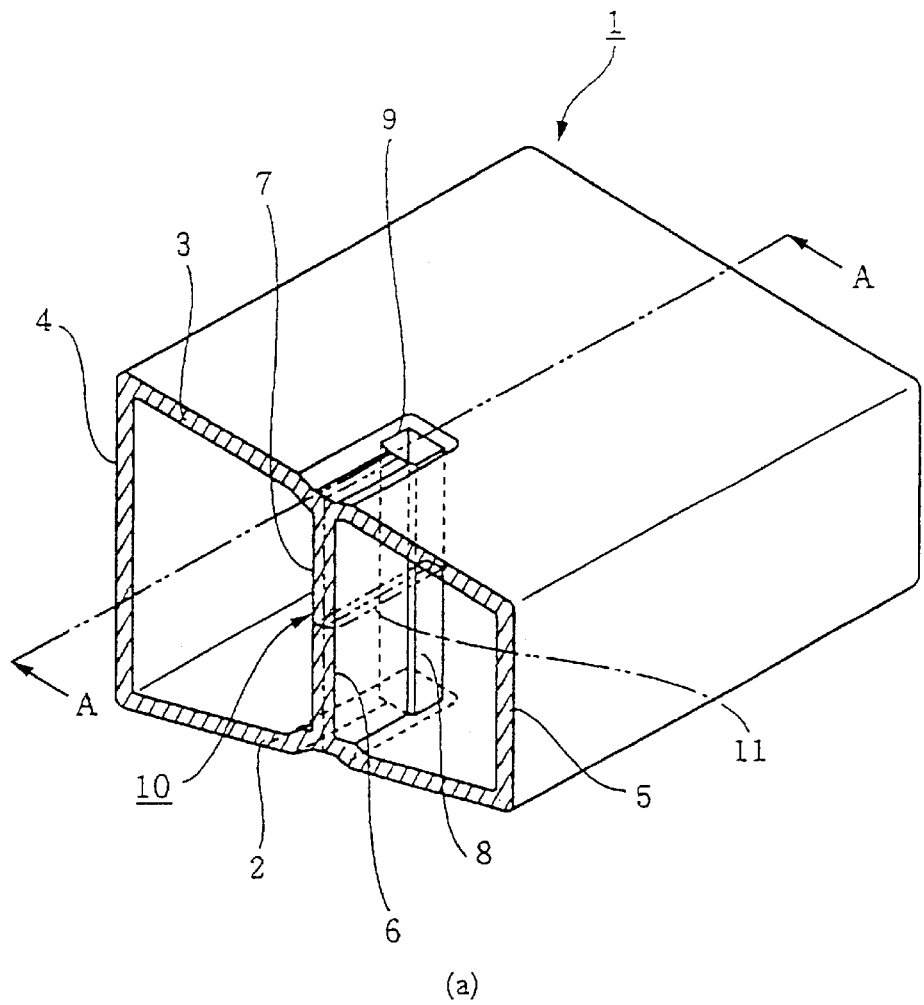
FIG. 1a shows a hollow article for an automobile according to a first embodiment of the invention, in which A is a schematic partial perspective view broken in the portion of impact absorbing rib
FIG. 1b shows a hollow article for an automobile according to a first embodiment of the invention showing a schematic partial sectional view along line A—A in FIG. 1a FIG. 2a shows a hollow article for an automobile according to a second embodiment of the invention, showing a schematic partial perspective view broken in the portion of impact absorbing rib
Figure 1:
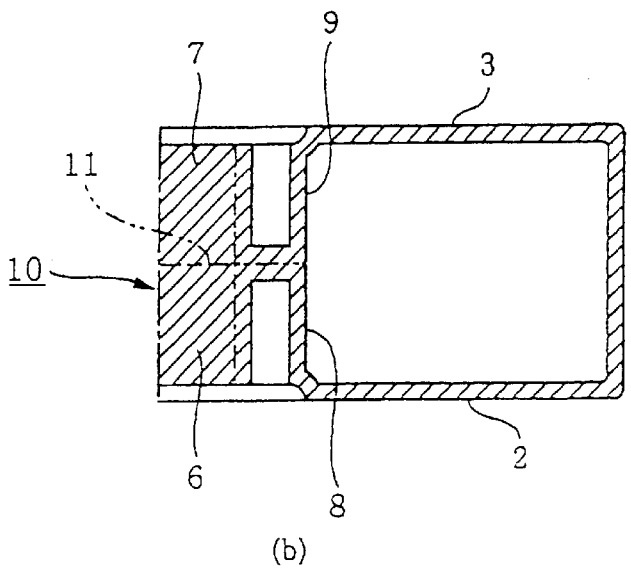

1 Hollow matter for automobile
2 First wall
3 Second wall
4 First side wall
5 Second side wall
6 First flat rib
7 Second flat rib
8 First hollow rib
9 Second hollow rib
10 Impact absorbing rib
11 Fusion portion FIGS. 2a, 2b, 15

Figure 2:
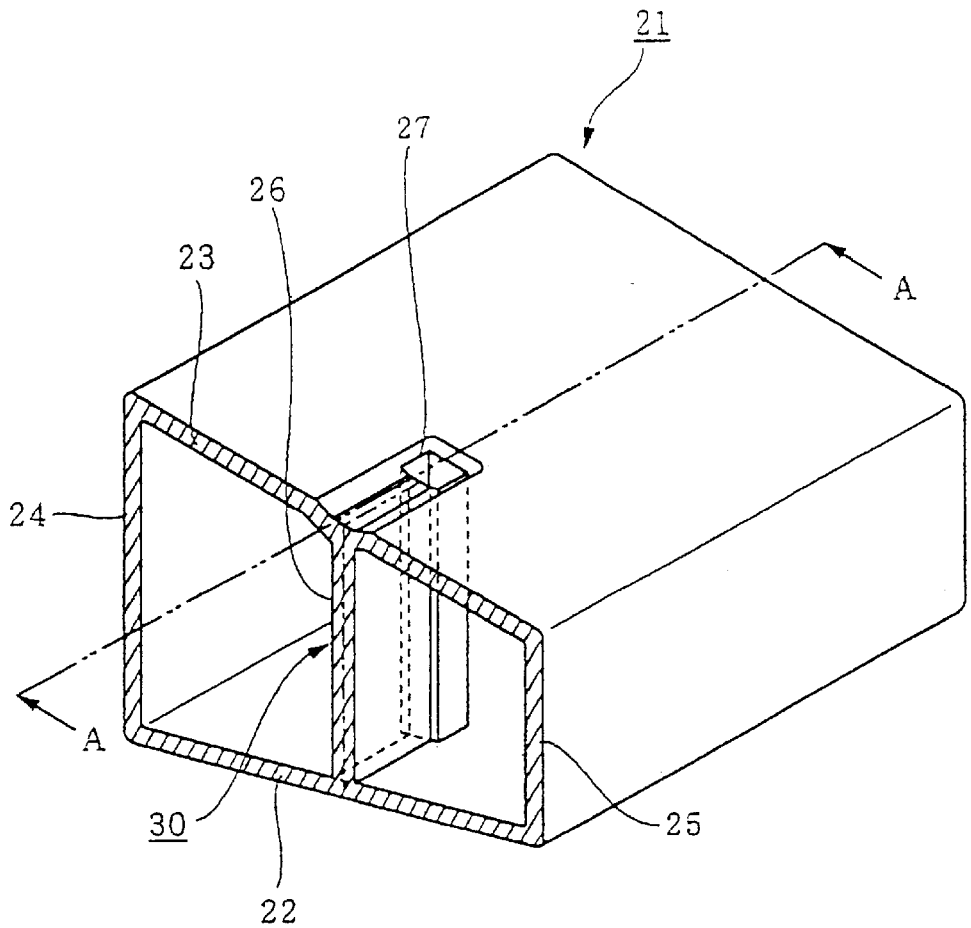
FIG. 2b shows a hollow article for an automobile according to a second embodiment of the invention, showing a schematic partial sectional view along line A—A in FIG. 2a FIG. 3 is an explanatory diagram showing an example of use of the hollow article for an automobile
Figure 2:
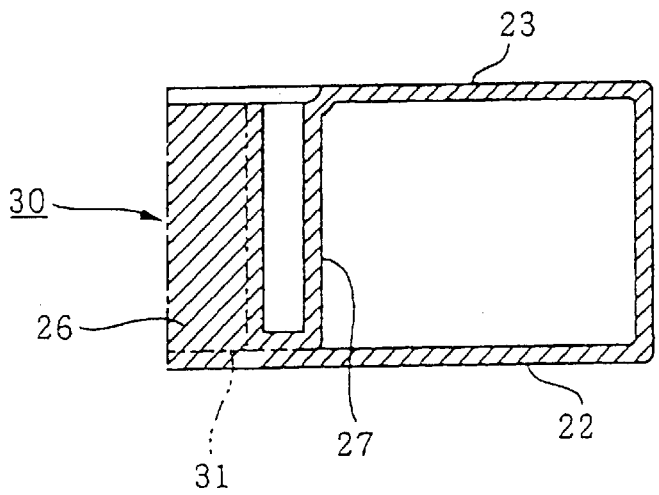
Figure 3:
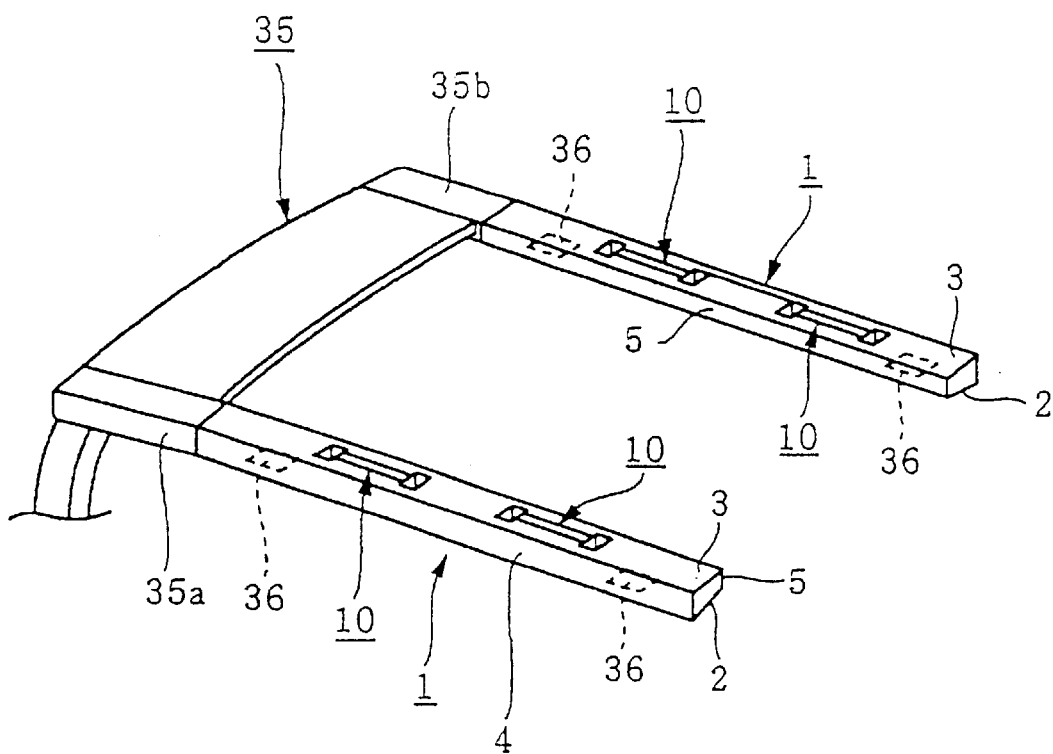
Figure 4:
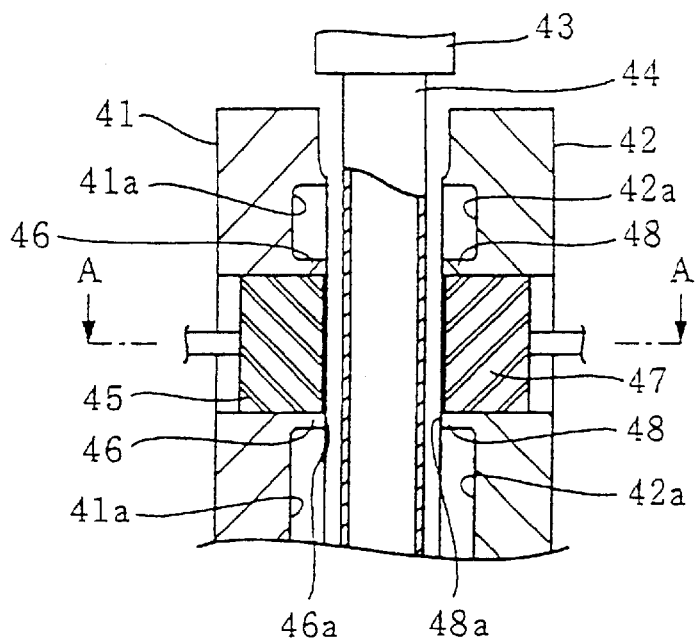
Figure 4:
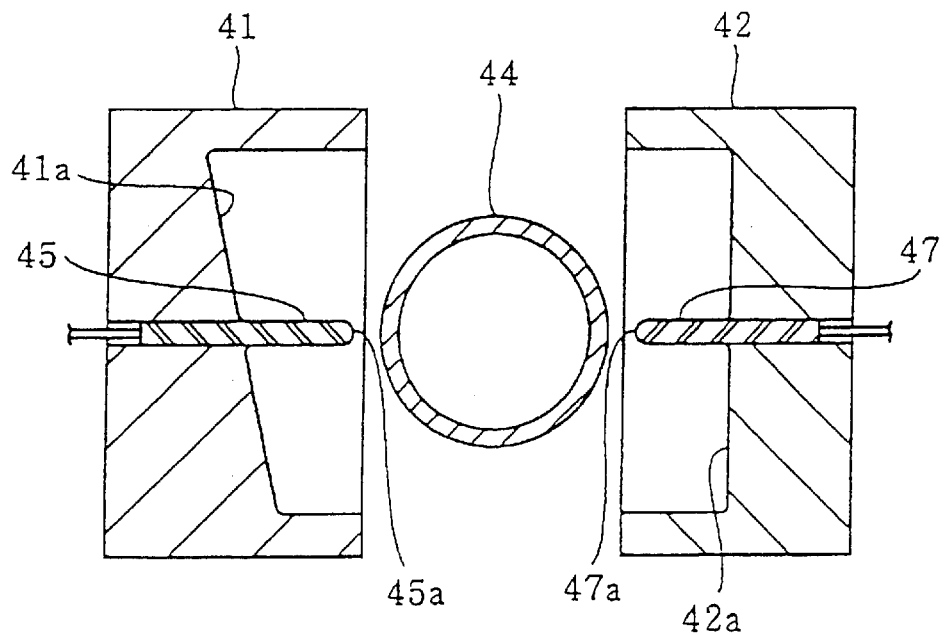
Figure 5:
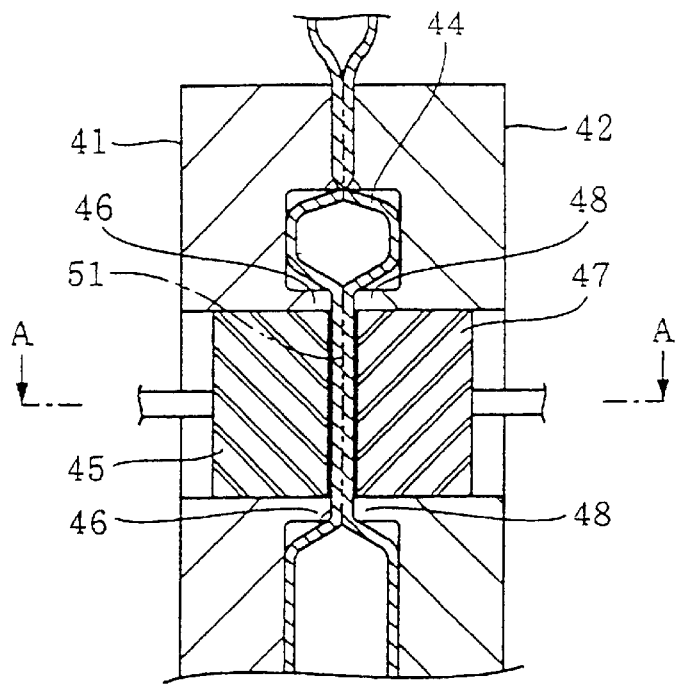
FIG. 5a shows a completely closed state of the molds after the process shown in FIG. 4a, illustrating a schematic partial sectional view along the axial direction of parison
FIG. 5b shows a completely closed state of the molds after the process shown in FIG. 4a, illustrating a schematic sectional view along line A—A in FIG. 5a FIG. 6a shows a completely withdrawn state of the slide core after the process shown in FIG. 5a, depicting a schematic partial sectional view along the axial direction of parison
Figure 5:
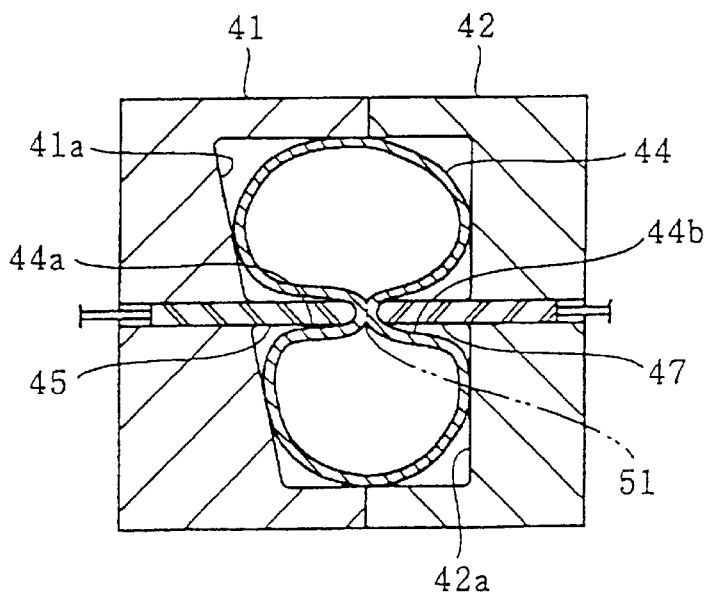
Figure 6:
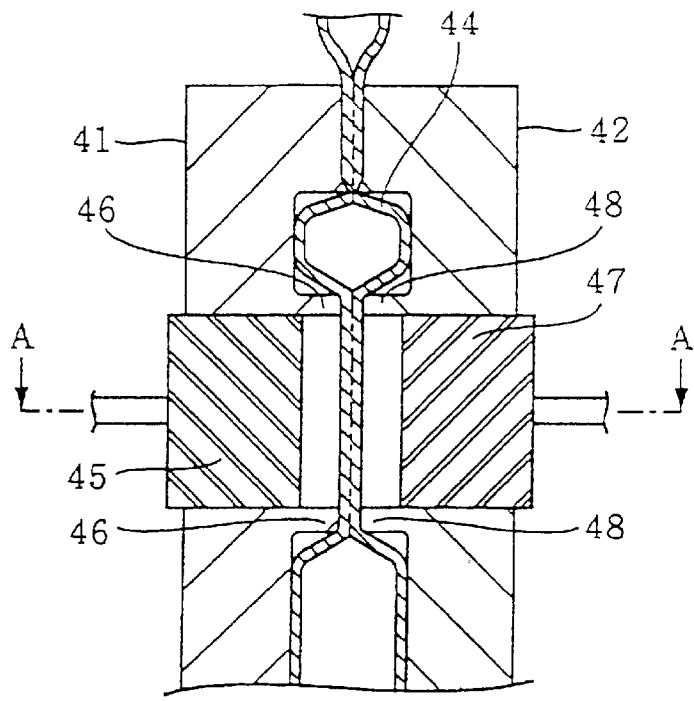
FIG. 6b shows a completely withdrawn state of the slide core after the process shown in FIG. 5a, depicting a schematic sectional view along line A—A in FIG. 6a FIG. 7a shows a completely introduced state of the pressurized air after the process shown in FIG. 6a, showing a schematic partial sectional view along the axial direction of parison
Figure 6:
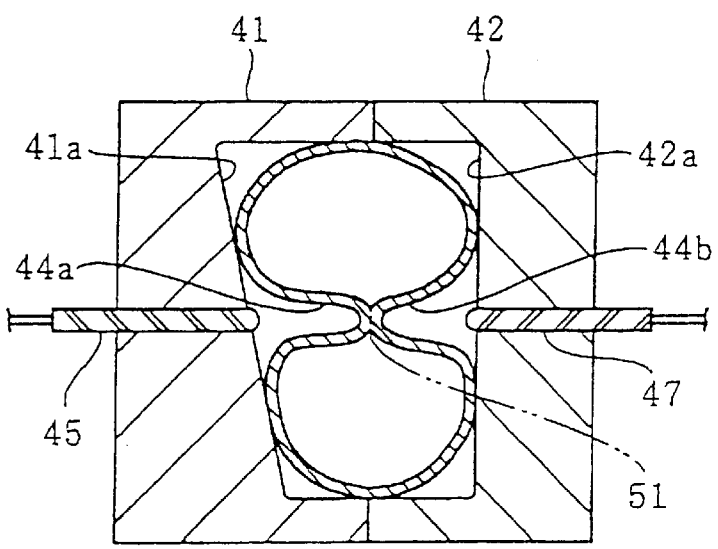
Figure 7:
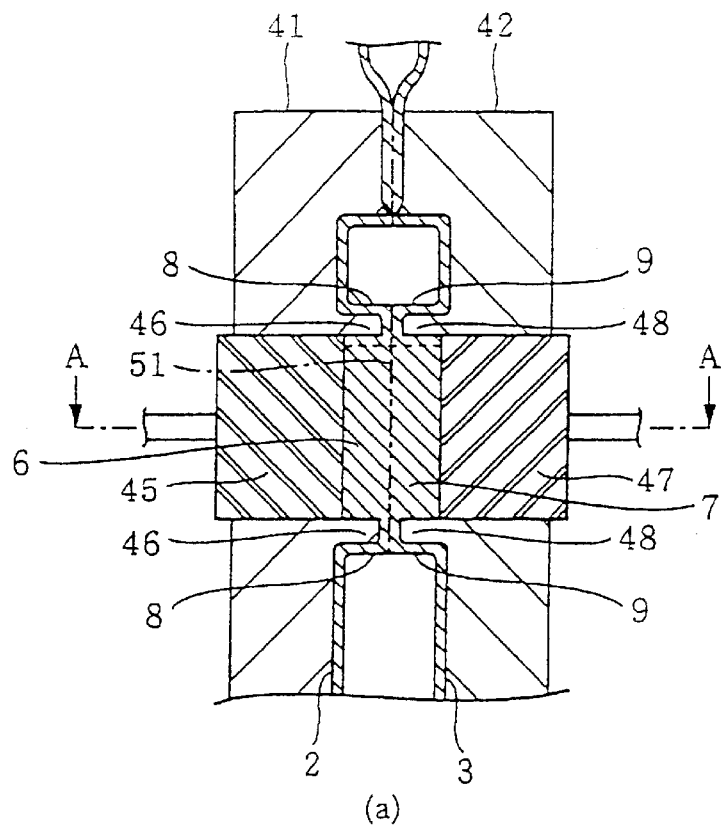
FIG. 7b shows a completely introduced state of the pressurized air after the process shown in FIG. 6a, showing a schematic sectional view along line A—A in FIG. 7a FIG. 8a is another example of a manufacturing method of a hollow article for the automobile, depicting an explanatory diagram showing a state of disposing a parison between opened molds
Figure 7:
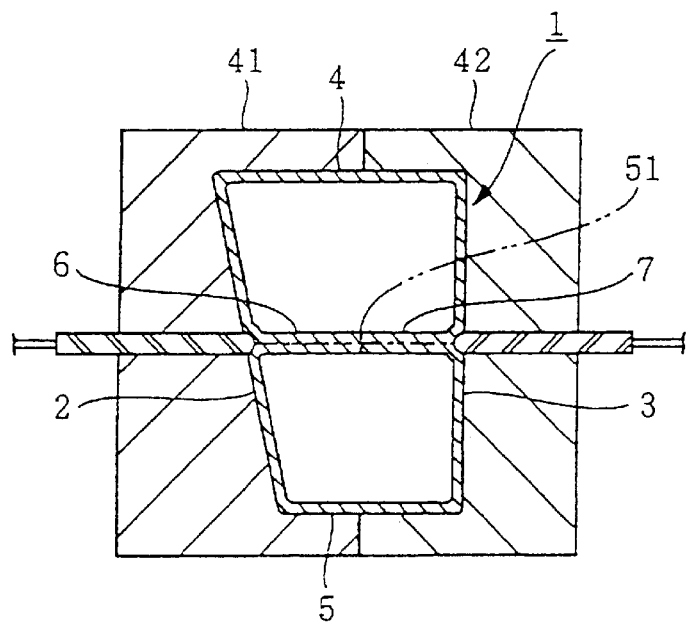
Figure 8:
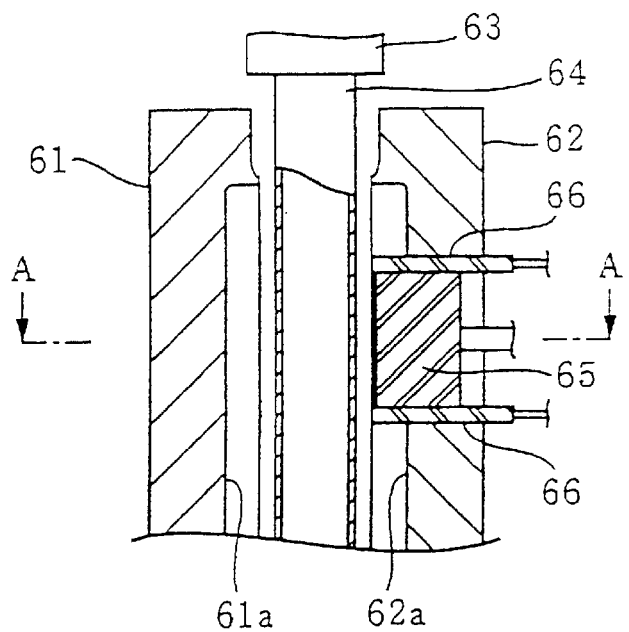
Figure 8:
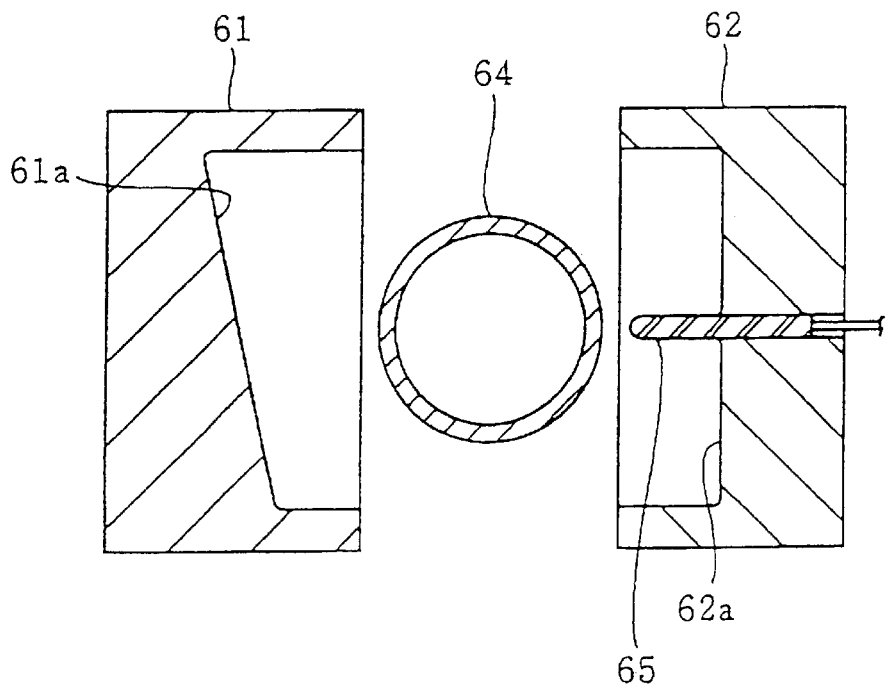
Figure 9:
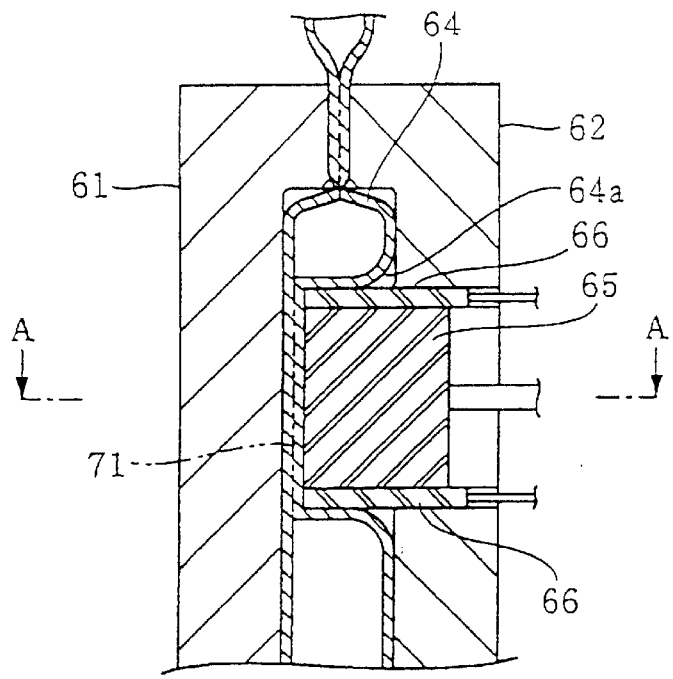
FIG. 9a shows a completely closed state of the molds after the process shown in FIG. 8a, illustrating a schematic partial sectional view along the axial direction of parison
FIG. 9b shows a completely closed state of the molds after the process shown in FIG. 8a, illustrating a schematic sectional view along line A—A in FIG. 9a FIG. 10a shows a completely introduced state of the pressurized air after the process shown in FIG. 9a, showing a schematic partial sectional view along the axial direction of parison
Figure 9:
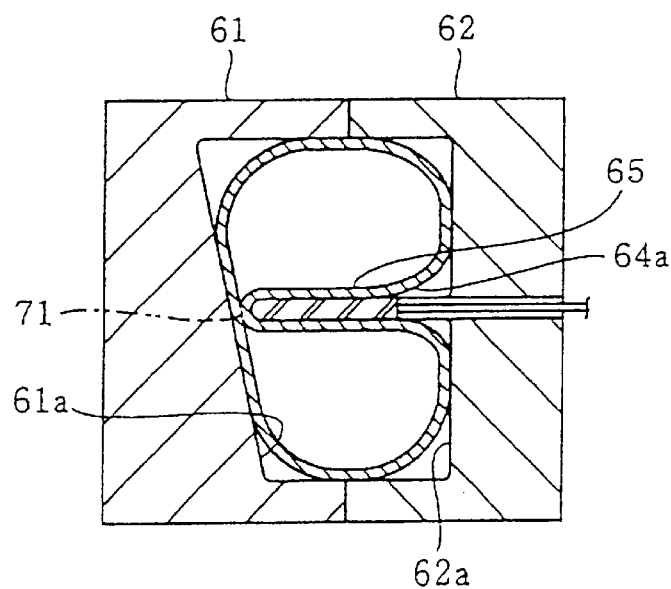
Figure 10:
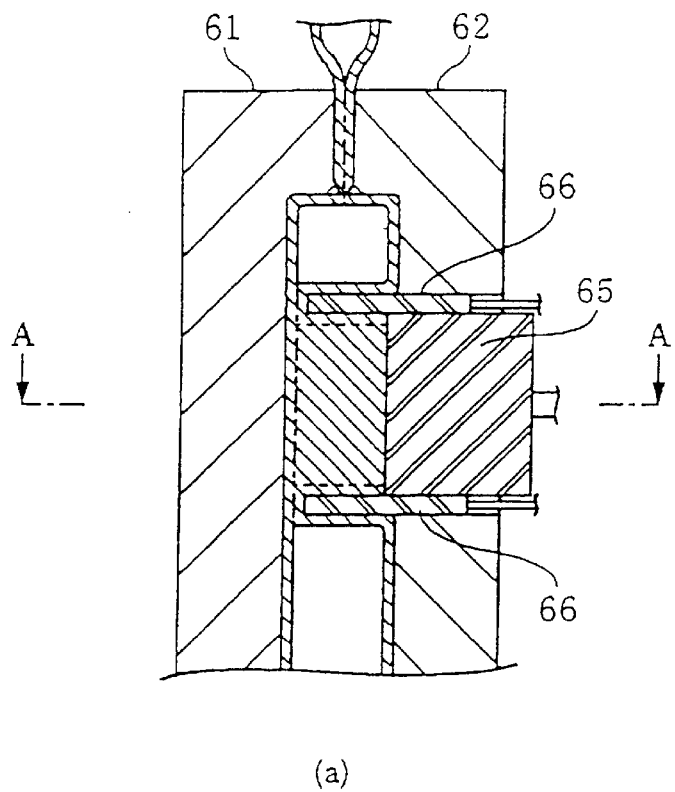
FIG. 10b shows a completely introduced state of the pressurized air after the process shown in FIG. 9a, showing a schematic sectional view along line A—A
Figure 10:
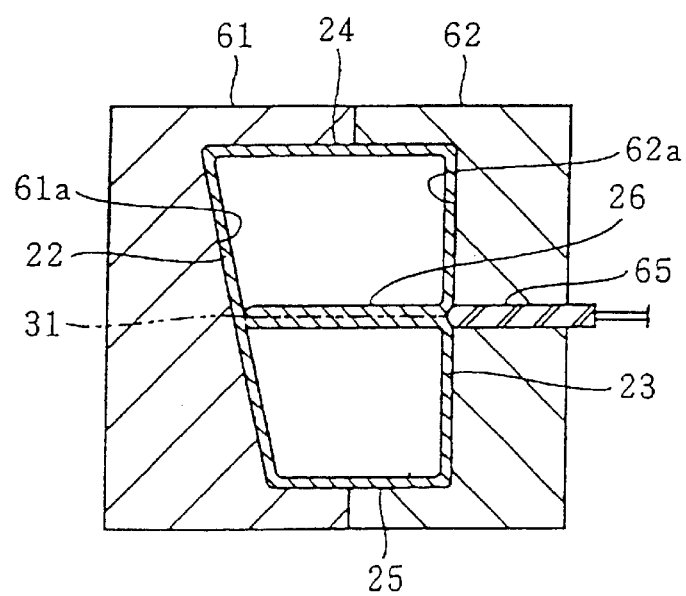
Figure 11:
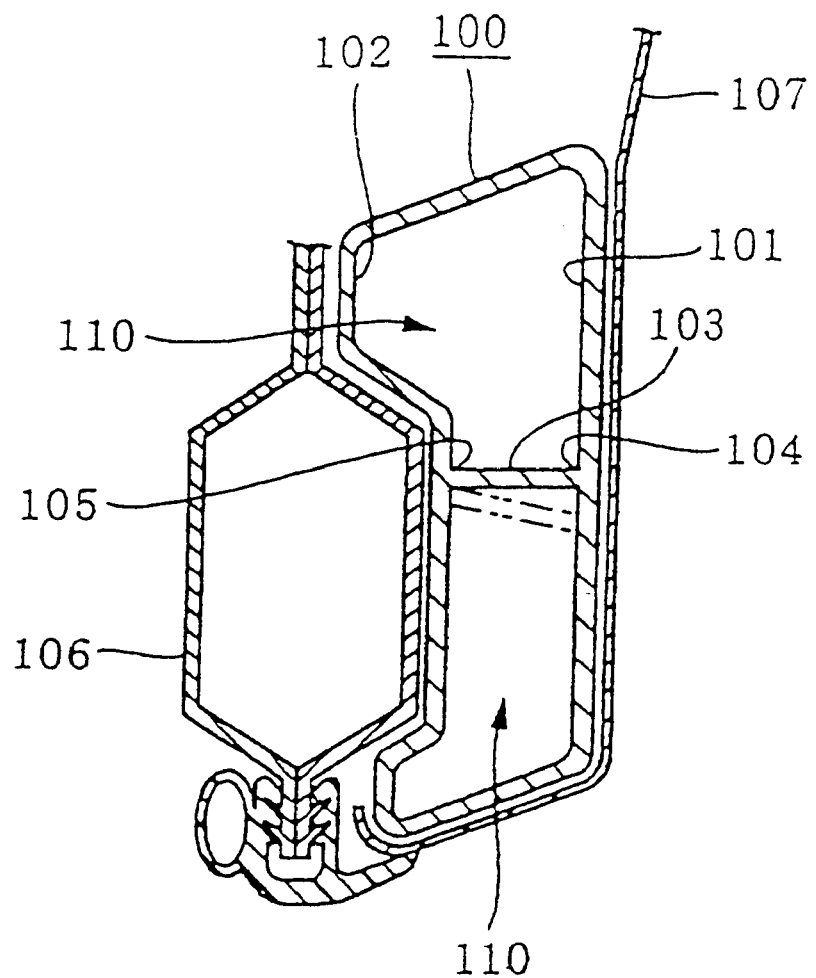
FIG. 11 is a prior art schematic sectional view after installation of an inner panel, showing a conventional roof side duct.
Figure 12:
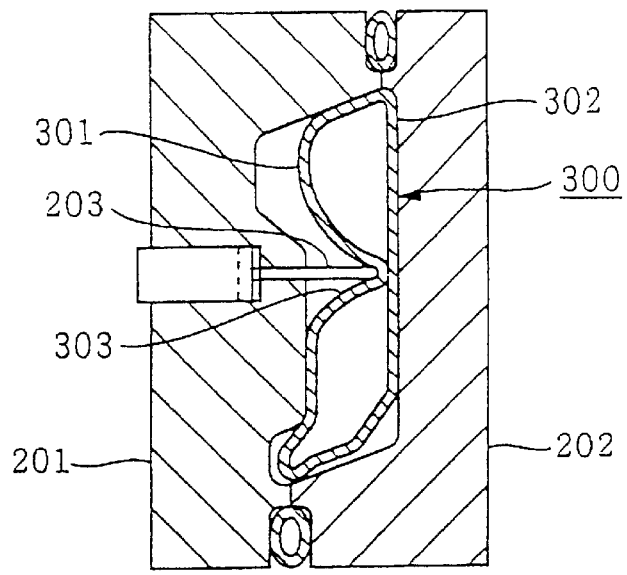
FIG. 12a is a prior art process for manufacturing the roof side duct shown in FIG. 11, depicting a schematic sectional view showing a forming state with the narrow neck in the parison by the rib forming plate
FIG. 12b is a prior art process for manufacturing the roof side duct shown in FIG. 11a, depicting a schematic sectional view showing a state upon completion of the introduction of pressurized air
Figure 12:
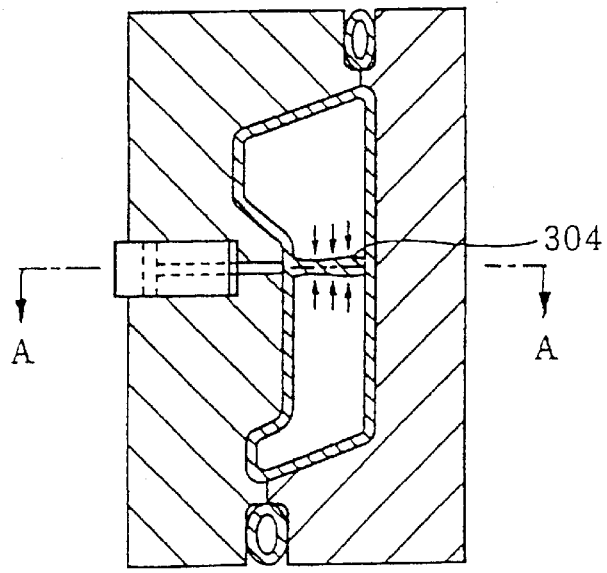
Figure 13:
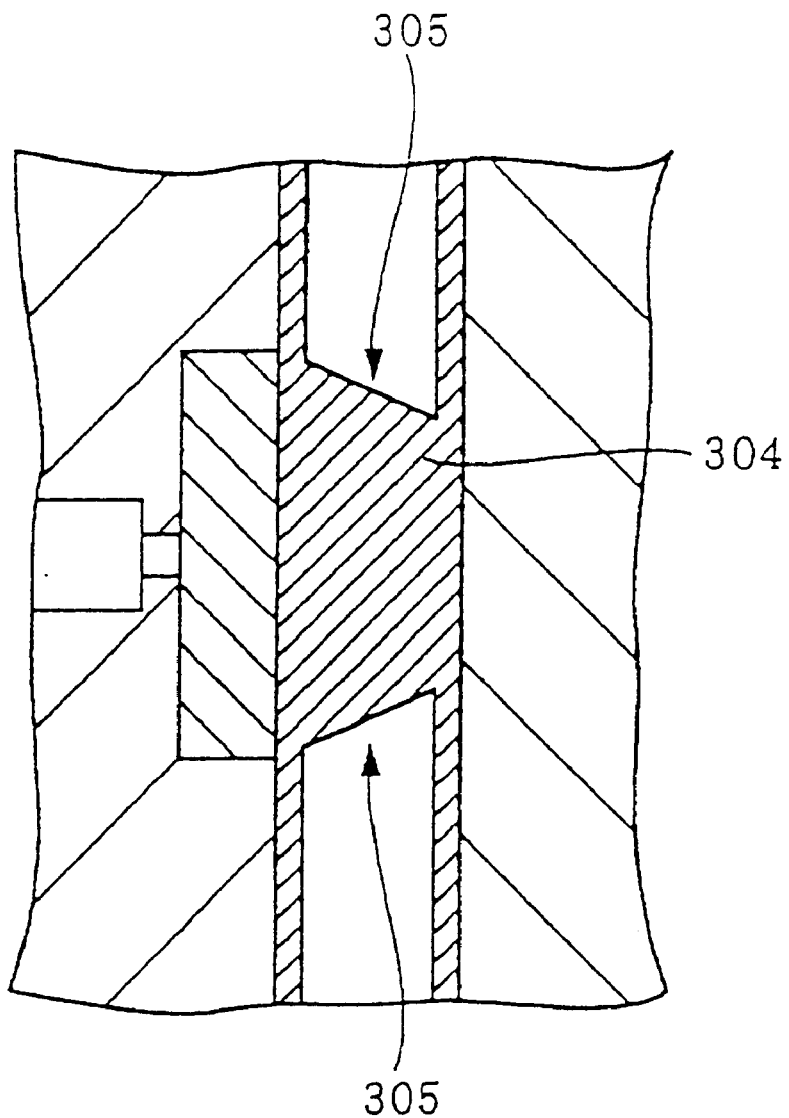
FIG. 13 is a prior art schematic sectional view along line X—X in FIG. 12b

21 Hollow matter for automobile
22 First wall
23 Second wall
26 Flat rib
27 Hollow rib
30 Impact absorbing rib 31 Fusion portion
FIG. 3
2 First wall
3 Second wall
4 First side wall
5 Second side wall
35 Connection duct
35a, 35b Junction
36 Discharge port
FIGS. 4a, 4b
41 First mold
41a, 42b Cavity
42 Second mold
43 Extrusion head
44 Parison
45, 47 Slide core
46, 48 Support core
FIGS. 5a, 5b
44a First recess
44b Second recess
51 Fusion portion
FIG. 6
44 Parison
FIGS. 7a, 7b
1 Hollow matter for automobile
2 First wall
3 Second wall
6 First flat rib
7 Second flat rib
8 First hollow rib
9 Second hollow rib
51 Fusion portion
FIGS. 8a, 8b
61 First mold
62 Second mold
63 Extrusion head
64 Parison
65 Slide core
FIGS. 9a, 9b
64 Parison
64a Recess
65 Slide core
66 Support core
71 Fusion portion
FIGS. 10a, 10b
22 First wall
23 Second wall
24 First side wall
25 Second side wall
26 Flat rib
31 Fusion portion
61 First mold
61a Cavity
62 Second mold
65 Slide core
66 Support core FIG. 11
101 Inside wall
102 Outside wall
103 Impact absorbing rib
106 Inner panel
107 Ceiling interior member
110 Space
FIGS. 12a, 12b
201 Split mold
202 Split mold
203 Rib forming plate
300 Parison
301 Support core
302 Second wall
303 Neck
304 Impact absorbing rib
FIG. 13
304 Impact absorbing rib
305 Reduced portion

DESCRIPTION OF THE PREFERRED EMBODIMENT

A first embodiment of the hollow article of the present invention, typically used in the automobile industry, is described in detail herein. FIG. 1a shows the hollow article as a partial perspective view broken in the portion of impact absorbing rib. FIG. 1b is a partial sectional view along line A—A in FIG. 1a.

The hollow article 1 of FIG. 1a is made of thermoplastic resin that is integrally formed by blow molding. It includes a first wall 2 and a second wall 3 mutually confronting across a space in an impact acting direction. The impact absorbing direction refers to the orientation of the hollow article in the desired application. For example, if the hollow article 1 were deployed in a roof of an automobile, either the first or second wall 2, 3 would be facing the interior of the vehicle and subject to being struck by the head of driver and/or passengers.

In this particular described embodiment the first wall 2 and second wall 3 are inclined with respect to each other. There is a first side wall 4 and a second side wall 5 formed consecutively to both side ends of the first wall 2 and second wall 3 confronting nearly parallel to each other.

The sectional shape of the hollow article 1 is not limited to the trapezoidal shape as shown in the embodiment of FIG. 1a with respect to the mutually confronting first wall 2 and second wall 3 being inclined. The article 1 may be formed as a square, rectangle, parallelogram or other arbitrary shape depending on the application and still be within the scope of the present invention.

Between the first wall 2 and second wall 3, there is an impact absorbing rib 10 formed integrally by blow molding. This impact absorbing rib 10 includes a first flat rib 6 projecting from the first wall 2 with a first hollow rib 8 adjacent to both side ends of the first flat rib 6. A second flat rib 7 projects from the second wall 3 with a second hollow rib 9 adjacent to both side ends of the second flat rib 7. The first and second flat rib 6, 7 meet at the fusion portion 11 as do the first and second hollow rib 8, 9. In a preferred embodiment the flat rib 6, 7 is generally rectangular with side ends connected to the hollow ribs 8, 9.

In the embodiment shown in FIG. 14, the shape of the interconnected first and second hollow ribs 8, 9 is concave.

The concave appearance is a result of the mating of the first hollow rib 8 and the second hollow rib 9 at the fusion portion 11. The first hollow rib 8 and second hollow rib 9 are both tapered such that they are more narrow at the fusion portion 11, resulting in a concave structure in one embodiment of the invention. The tapered appearance of the first and second hollow rib 8, 9 is affected by the shape of the support core to some extent. Thus, in one of the embodiments, a tapered support core with a narrow portion extending to the fusion portion affects the shape of the hollow rib. However, the present invention is not limited to a concave shape for the hollow rib 8, 9.

A second embodiment of a hollow article 21, also useful in the automobile industry is described and depicted in FIGS. 2a and 2b. FIG. 2a shows a hollow article 21 according to the second embodiment, a schematic partial perspective view broken in the portion of impact absorbing rib. FIG. 2b is a schematic partial sectional view along line A—A in FIG. 2a.

A hollow article 21 is made of thermoplastic resin formed integrally by blow molding, and includes first wall 22 and second wall 23 mutually confronting across a space in an impact acting direction. The second wall 23 is inclined to the first wall 22 in this embodiment. A first sidewall 24 and second sidewall 25 are formed consecutively to both side ends of the first wall 22 and second wall 23 respectively and confront nearly parallel to each other.

Between the first wall 22 and second wall 23, there is an impact absorbing rib 30 formed integrally by blow molding. This impact absorbing rib 30 includes a flat rib 26 projecting from second wall 23 to first wall 22 and a hollow rib 27 adjacent to both side ends of the flat rib 26 which are integrated through a fusion portion 31.

As shown in FIG. 15, the shape of the impact absorbing rib 30 is tapered. The tapered appearance is a result of the mating of the hollow rib 27 to the fusion portion 31. The hollow rib 27 is both tapered such that it is more narrow at the fusion portion 31. However, the present invention is not limited to a tapered shape for the impact absorbing rib 30.

The thermoplastic resin used for blow molding the hollow article is not particularly limited, and any of the thermoplastic grade materials are acceptable. Various compounds may be used for the present invention, and preferred examples include high-density polyethylene, medium density polyethylene, polypropylene, denatured polyphenylene oxide, polycarbonate, polyamide, and ABS resin.

The hollow article of the present invention may be used in automobile applications, such as for automobile damper, hood, door, console box lid, air conditioning duct, and other interior and exterior parts. The implementation of the present invention in the automotive industry can enhance the safety of the vehicle and provide better protection for the driver and passengers.

The head injury criteria obtained by the present invention was approximately 800, which is within the guidelines established by FMVSS 201. Prior art hollow articles tested had a head injury criteria that was above the limit set by FMVSS 201. In addition, one of the advantages of the present invention is the repeatability, reliability and consistency of the hollow articles. Prior art articles tend to have a much greater variability in the thickness and dimensions of the impact absorbing rib and effecting the head injury criteria.

FIG. 3 illustrates an example of the hollow article shown in FIG. 1a in the air conditioning duct for an automobile, disposed at both sides of the car compartment ceiling. As shown in FIG. 3, the hollow article 1 is disposed at both sides of the car compartment ceiling and shows two impact absorbing ribs 10 disposed at an interval along the longitudinal direction of the compartment ceiling ducts. One end of the ducts interconnect with junctions 35a, 35b which are disposed at both sides of a connection duct 35 and the second end side of the duct is closed. First wall 2 and second side wall 5 face the inside of the compartment, and second wall 3 and first side wall 4 face the car body side, and a discharge port 36 is provided at a position not forming the impact absorbing rib 10 of first wall 2.

The air conditioning air supplied from the air conditioner (not shown) through the connection duct 35 is discharged toward the passengers and driver through a passage of the hollow article 1 formed at both sides of the impact absorbing rib 10, from the discharge port 36, so that the compartment can be air conditioned uniformly.

In the event of a car crash, if the head of a driver or passenger collides against the first wall 2, this impact is absorbed by the impact absorbing rib 10 lessening the effects or damages from the impact.

The impact absorbing rib 10 as described herein is not limited to a single rib per article. As shown in FIG. 3, two or more impact absorbing ribs 10 may be disposed as required at a mutual spacing. The determination of the mutual spacing depends upon many factors including the required structural support, length of the article, dimension of the article, compounds used to manufacture the article, as well the intended impact absorbing qualities desired.

An example of a manufacturing system of the hollow article is explained in detail in FIGS. 4a and 4b. This particular embodiment utilizes two sliding cores 45, 47. A first mold 41 and second mold 42 are opened. In one embodiment the support cores 46, 48 and slide cores 45, 47 are projecting to a position where the leading ends 45a, 47a of the sliding cores are nearly flush with leading ends 46a, 48a of the support cores 46, 48, and wherein the sliding core is a generally rectangular flat plate disposed between the support cores.

The first mold 41 includes a cavity 41a for defining the outer surface of nearly half of the first wall 2 side of tie hollow article, the slide core 45 for forming first flat rib 6, and a pair of support cores 46 for forming first hollow rib 8 disposed adjacently to both side ends of first flat rib 6. By contrast, the second mold 42 includes a cavity 42a for defining the outer surface of the remaining portion of the second wall 3 side of the hollow article, the slide core 47 for forming second flat rib 7, and a pair of support cores 48 for forming second hollow rib 9 disposed adjacently to both side ends of second flat rib 7.

The support cores 46, 48 are not limited to the illustrated example. Retractable support cores 66 like those shown in FIG. 8 may be also used in the present invention.

Next, a parison 44 made of molten thermoplastic resin is extruded from an extrusion head 43 of an extruder (not shown) and is poured into the opened molds 41, 42, and then the molds 41, 42 are gradually closed.

As the molds 41, 42 are being closed, with or without a time delay, the slide core 45 and support cores 46 of the first mold project towards the slide core 47 and support cores 48 of the second mold 42. As the molds are being closed, as shown in FIGS. 5a and 5b, the first wall side of the parison 44 is pushed and deformed by the slide core 45 and support cores 46 of the first mold 41 and one recess 44a is formed, while the second wall side of the parison 44 is pushed and deformed by the slide core 47 and support cores 48 of the second mold 42 and second recess 44b is formed. When the molds 41, 42 are completely closed, the leading end of first recess 44a and leading end of second recess 44b are fused, and a fusion portion 51 is formed.

Then the slide cores 45, 47 are retracted as shown in FIGS. 6a and 6b. In this case, both sides of first recess 44a and second recess 44b are fixed at their positions by the support cores 46, 48. Only slide cores 45, 47 are drawn back, and therefore as the slide cores 45, 47 are retracted, the recesses 44a, 44b formed in the parison 44 are not dragged. The combination of the elements contribute to the hollow rib being formed about the support cores with uniform and consistent structural dimensions. Contributing to the production is the surface tension of the thermoplastic material at the fusion portion to maintain the shape within the molds 41, 42 while the sliding cores 45, 47 are retracted.

An inflation or blow means such as a blow needle (not shown) is poked into the parison 44, and pressurized air is introduced to inflate the parison 44 into a shape along the outer surface of the cavities 41a, 42a and support cores 46, 48, and the wall surfaces facing the recesses 44a, 44b are pressed and deformed by internal pressure of the pressurized air, as shown in FIGS. 7a and 7b. Although pressurized air is used in this embodiment, it is also within the scope of the invention to utilize pressurized gases to inflate the parison 44.

As a result of the pressurized air, the first wall 2 and second wall 3 are disposed in a confronting orientation. Between the first wall 2 and second wall 3, the leading ends of the first flat rib 6 project from the first wall 2. The first hollow rib 8, adjacent to both side ends of first flat rib 6, projects from the first wall 2. The leading ends of the second flat rib 7 project from second wall 3. The second hollow rib 9, adjacent to both side ends of second flat rib 7, projects from the second wall 3. The first flat rib 6 and second flat rib 7 are integrated through the fusion portion 11, thereby completing impact absorbing rib 10.

After cooling in the molds 41, 42, and opening the molds, the hollow article 1 is removed and deflashed.

Another example of a manufacturing method of the hollow article of the present invention is explained herein. As shown in FIGS. 8a, 8b, first mold 61 and second mold 62 are opened with the slide core 65 and support core 66 of the first mold 61 and second mold 62 retracted as shown.

Herein, the first mold 61 includes a cavity 61a for defining the outer surface of nearly half of the first wall 22 side of the hollow article 21. By contrast, the second mold 62 includes a cavity 62a for defining the outer surface of the remaining portion of the second wall 23 side of the hollow article 21, the slide core 65 for forming a flat rib 26, and a pair of support cores 66 for forming a pair of hollow ribs 27 disposed adjacently to both side ends of the flat rib 26. In this particular embodiment the pair of support cores 66 are retractable. The support cores 66 are not limited to the illustrated retractable example, but may be disposed integrally in the second mold 62.

A parison 64 made of molten thermoplastic resin is extruded from an extrusion head 63 of an extruder not shown in the diagram, and is poured into the opened molds 61, 62, and the molds are closed.

As the molds 61, 62 are being closed, with or without a time delay, the slide core 65 and support core 66 project toward the second mold 66, as shown in FIGS. 9a and 9b. The first wall side of the parison 64 is pushed and deformed and a recess 64a is formed, then the leading end of the recess 64a is fused to the inner surface of the second wall side of the parison, and a fusion portion 71 is formed.

After closing the molds 61, 62, while the support core 66 is projecting, the slide core 65 is retracted. As the slide core 65 is retracted, the recess 64a formed in the parison 64 is not dragged or otherwise deformed.

Next, blow means, such as a blow needle (not shown), is poked into the parison 64, and pressurized air is introduced to inflate the parison 64, as shown in FIGS. 10a and 10b into a shape along the outer surface of the cavities 61a, 62a and support core 66. The wall surface facing the recess 64a is pressed and deformed by internal pressure of the pressurized air. Other means of introducing pressurization are well known in the art and are within the scope of the present invention.

As defined herein, the term gas includes air, other gases, and any combination of gases and air. The use of such gases for pressurization is known in the art, the present invention is not limited to air. Other gases are well within the scope of the invention such as nitrogen gas.

As a result, the confronting first wall 62 and second wall 63 are disposed at an interval to provide proper rigidity and impact absorbing qualities. The ribs are orientated in the impact action direction between the first wall 62 and second wall 63. The leading ends of the flat rib 26 projecting from first wall 62 to second wall 63 and the hollow rib 27 adjacent to both side ends of the flat rib 26 are integrated through the fusion portion 71 on the inner surface from second wall 63, thereby completing the impact absorbing rib 30.

The final step involves cooling in the molds, opening the molds 61, 62, removing the hollow article 21, and deflashing. The support cores, if retractable, can be retracted once the hollow ribs are formed.

In the manufacturing method of the hollow article according to the invention, the surface of the slide core retractably disposed in the mold may be covered with a coating layer made of fluoroplastic resin which makes it easier to slide. The application of the coating layer of fluoroplastic resin is improved by roughening the surface of the slide core and then applying a coating layer of fluoroplastic resin on the rough surface.

The coating layer is not limited to a thin layer of fluoroplastic resin, but can also be formed by co-deposition of fluoroplastic resin and plating solution such as electroless nickel in a treating solution, and applying and baking the treating solution on the surface of the slide core. Alternatively, the coating layer can also be prepared by forming an electroless nickel coating on the surface of the slide core, and impregnating fluoroplastic resin in this electroless nickel coating.

The hollow article of the present invention, used for example in the automotive industry, encompasses an impact absorbing rib made of flat rib and hollow rib disposed adjacently to both side ends of the flat rib and is integrally formed between the confronting first wall and second wall disposed at an interval in impact action direction. There is an impact absorbing rib uniform in shape, dimensions and wall thickness on the whole and is integrally formed by blow molding. As a result, a hollow article useful with an excellent impact absorbing performance is obtained.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A method of blow molding a hollow article having a first wall and a second wall confronting across a spacing, with an integral rib disposed between said first wall and said second wall, comprising the steps of:

opening a split mold, wherein said split mold has a first mold half with a cavity, and a second mold half with a cavity, a slide core and a pair of support cores on either side of said slide core;

extruding a parison of molten thermoplastic resin between said split mold;

closing said split mold;

deforming said parison with said sliding core and said pair of support cores and forming a recess, wherein a leading end of said recess is fused to an inner surface of an opposing wall side;

retracting said slide core;

introducing a pressure substance into said parison;

inflating said parison along a cavity surface of said split molds and said support cores and forming said integral rib between said first wall and said second wall, wherein said integral rib comprises a flat rib and a pair of hollow ribs; and cooling said split mold, opening said split mold and removing said hollow article.

2. The method of blow molding a hollow article according to claim 1, wherein said step of retracting said slide cores is simultaneous with said step of introducing said pressure substance.

3. The method of blow molding a hollow article according to claim 1, wherein said support cores are retractable.

4. The method of blow molding a hollow article according to claim 1, further comprising the step of retracting said support cores after said article has cooled.

5. The method of blow molding a hollow article according to claim 1, wherein said pressurized substance is a gas.

6. The method of blow molding a hollow article according to claim 5, wherein said gas is chosen from the group of gasses consisting of nitrogen and air.

7. The method of blow molding a hollow article according to claim 1, further comprising, before the step of extruding a parison, the steps of:

roughening a surface of said slide core; and coating said surface of said slide core with fluoroplastic resin.

8. The method of blow molding a hollow article according to claim 1, further comprising, after the step of extruding a parison, the step of:

maintaining the mold in an open position.

9. A method of blow molding a hollow article having a first wall and a second wall confronting across a spacing, with an integral rib disposed between said first wall and said second wall, comprising the steps of:

opening a split mold, wherein said split mold has a first mold half with a cavity, a slide core and a pair of support cores on either side of said slide core, and a second mold half with a cavity, a slide core and a pair of support cores on either side of said slide core;

extruding a parison of molten thermoplastic resin between said split mold;

closing said split mold;

deforming said parison with each said sliding core and each of said pair of support cores and forming a first recess and a second recess, wherein a leading end of said first recess and a leading end of said second recess are fused;

retracting each of said slide cores;

introducing a pressure substance into said parison;

inflating said parison along a cavity surface of said split molds and said support cores and forming said integral rib between said first wall and said second wall, wherein said integral rib comprises a pair of flat ribs and a pair of hollow ribs; and cooling said split mold, opening said split mold and removing said hollow article.

10. The method of blow molding a hollow article according to claim 9, wherein said step of retracting said slide cores is simultaneous with said step of introducing said pressure substance.

11. The method of blow molding a hollow article according to claim 9, wherein said support cores are retractable.

12. The method of blow molding a hollow article according to claim 9, further comprising the step of retracting said support cores after said article has cooled.

13. The method of blow molding a hollow article according to claim 9, wherein said pressurized substance is a gas.

14. The method of blow molding a hollow article according to claim 13, wherein said gas is chosen from the group of gasses consisting of nitrogen and air.

15. The method of blow molding a hollow article according to claim 9, further comprising, before the step of extruding a parison, the steps of:

roughening a surface of said slide core; and coating said surface of said slide core with fluoroplastic resin.

16. The method of blow molding a hollow article according to claim 9, further comprising, after the step of extruding a parison, the step of:

maintaining the mold in an open position.

* * * * *

UNITED STATES PATENT AND TRADEMARK OFFICE
CERTIFICATE OF CORRECTION

PATENT NO. : 6,726,874 B2
DATED : April 27, 2004
INVENTOR(S) : Kenji Iwasaki

It is certified that error appears in the above-identified patent and that said Letters Patent is hereby corrected as shown below:

Title page,
Item [73], Assignee, delete "Kybraku", insert -- Kyoraku --

Signed and Sealed this

Fourth Day of January, 2005

JON W. DUDAS
*Director of the United States Patent and Trademark Office*